(12) United States Patent
Olesen

(10) Patent No.: US 8,733,164 B2
(45) Date of Patent: May 27, 2014

(54) WIND TURBINE OPTICAL WIND SENSOR

(75) Inventor: Ib Svend Olesen, Randers NØ (DK)

(73) Assignee: Vestas Wind Systems A/S, Aarhus N. (DK)

( * ) Notice: Subject to any disclaimer, the term of this patent is extended or adjusted under 35 U.S.C. 154(b) by 142 days.

(21) Appl. No.: 13/576,366

(22) PCT Filed: Feb. 3, 2011

(86) PCT No.: PCT/DK2011/050028
§ 371 (c)(1),
(2), (4) Date: Aug. 21, 2012

(87) PCT Pub. No.: WO2011/095170
PCT Pub. Date: Aug. 11, 2011

(65) Prior Publication Data
US 2012/0318057 A1    Dec. 20, 2012

Related U.S. Application Data

(60) Provisional application No. 61/301,451, filed on Feb. 4, 2010.

(30) Foreign Application Priority Data

Feb. 4, 2010   (GB) .................................. 1001855.4

(51) Int. Cl.
*G01W 1/00* (2006.01)
*G01P 5/00* (2006.01)

(52) U.S. Cl.
USPC ..................................... 73/170.06; 73/170.11

(58) Field of Classification Search
None
See application file for complete search history.

(56) References Cited

U.S. PATENT DOCUMENTS

| 4,251,733 A | 2/1981 | Hirleman, Jr. |
| 4,387,993 A | 6/1983 | Adrian |

(Continued)

FOREIGN PATENT DOCUMENTS

| DE | 31 06 624 | 9/1982 |
| DE | 31 48 867 | 6/1983 |

(Continued)

OTHER PUBLICATIONS

Schodl R et al., "A new multicolour laser two focus velocimeter for 3-dimensional flow analysis", Sep. 18, 1989, 10 pages.

(Continued)

*Primary Examiner* — Lisa Caputo
*Assistant Examiner* — Jermaine Jenkins
(74) *Attorney, Agent, or Firm* — Wood, Herron & Evans, LLP

(57) ABSTRACT

The invention comprises a wind turbine having an optical wind sensor 10. The optical wind sensor generates one or more multiple beams of light 42, each of which forms a sensor beam pointing along a sensor axis. Where more than one sensor beam is used the beams are arranged so that the different sensor axes lie at least partly orthogonal to each other, allowing the wind direction 40 to be detected for any direction of wind. Each multiple sensor beam comprises at least two individual sensor beams having different respective wavelengths of light. The different color of the individual light beams allows the sensor system to detect which of the light beams is triggered first when matter in the wind passes through the beam and reflects light back to light collecting device.

18 Claims, 6 Drawing Sheets

(56) References Cited

U.S. PATENT DOCUMENTS

| | | | |
|---|---|---|---|
| 4,671,659 A | 6/1987 | Rempt et al. | |
| 4,912,530 A | 3/1990 | Bessho | |
| 4,996,419 A | 2/1991 | Morey | |
| 5,009,505 A | 4/1991 | Malvern | |
| 5,094,527 A | 3/1992 | Martin | |
| 5,160,976 A | 11/1992 | Carr et al. | |
| 5,201,015 A | 4/1993 | von Bieren et al. | |
| 5,250,802 A | 10/1993 | Runner | |
| 5,308,973 A | 5/1994 | Odoni et al. | |
| 5,488,475 A | 1/1996 | Friebele et al. | |
| 5,633,748 A | 5/1997 | Perez et al. | |
| 5,649,035 A | 7/1997 | Zimmerman et al. | |
| 5,726,744 A | 3/1998 | Ferdinand et al. | |
| 5,973,317 A | 10/1999 | Hay | |
| 6,125,216 A | 9/2000 | Haran et al. | |
| 6,301,968 B1 | 10/2001 | Maruyama et al. | |
| 6,586,722 B1 | 7/2003 | Kenny et al. | |
| 6,640,647 B1 | 11/2003 | Hong et al. | |
| 7,086,834 B2 | 8/2006 | LeMieux | |
| 7,221,438 B2 * | 5/2007 | Harris | 356/28.5 |
| 7,428,086 B2 * | 9/2008 | Dufour et al. | 359/196.1 |
| 7,690,250 B2 * | 4/2010 | Hickey | 73/170.11 |
| 7,703,331 B2 | 4/2010 | Magne et al. | |
| 8,381,599 B2 * | 2/2013 | Bosselmann | 73/861.18 |
| 2002/0057436 A1 | 5/2002 | Skinner et al. | |
| 2003/0066356 A1 | 4/2003 | Kanellopoulos et al. | |
| 2003/0127587 A1 | 7/2003 | Udd et al. | |
| 2004/0057828 A1 | 3/2004 | Bosche | |
| 2004/0114850 A1 | 6/2004 | Dewyntermarty et al. | |
| 2004/0252290 A1 | 12/2004 | Ferguson et al. | |
| 2005/0088660 A1 | 4/2005 | Ronnekleiv | |
| 2005/0276696 A1 | 12/2005 | LeMieux | |
| 2006/0000269 A1 * | 1/2006 | LeMieux et al. | 73/170.01 |
| 2006/0146337 A1 | 7/2006 | Hartog | |
| 2006/0285813 A1 | 12/2006 | Ferguson | |
| 2007/0223004 A1 | 9/2007 | Baillon et al. | |
| 2007/0280582 A1 | 12/2007 | Sanders | |
| 2007/0284112 A1 | 12/2007 | Magne et al. | |
| 2008/0013879 A1 | 1/2008 | Mossman | |
| 2008/0317598 A1 | 12/2008 | Barbu et al. | |
| 2009/0097976 A1 | 4/2009 | Driver et al. | |
| 2012/0229792 A1 * | 9/2012 | Fuglsang et al. | 356/28 |

FOREIGN PATENT DOCUMENTS

| | | |
|---|---|---|
| DE | 3712153 C1 | 7/1988 |
| DE | 195 24 036 | 7/1996 |
| DE | 253 669 | 1/1998 |
| DE | 199 23 087 | 12/2000 |
| DE | 199 27 015 | 12/2000 |
| DE | 202 06 704 | 8/2002 |
| DE | 101 60 522 | 6/2003 |
| DE | 103 15 676 | 11/2004 |
| EP | 0 640 824 | 3/1995 |
| EP | 0 857 291 | 5/1997 |
| EP | 0 984 243 | 3/2000 |
| EP | 1 148 324 | 10/2001 |
| EP | 1 249 692 | 10/2002 |
| EP | 1 359 321 | 11/2003 |
| EP | 1 466 827 | 10/2004 |
| EP | 1 586 854 | 10/2005 |
| EP | 1 770 278 | 4/2007 |
| EP | 1 780 523 | 5/2007 |
| EP | 1 873 395 | 1/2008 |
| EP | 1 911 968 | 4/2008 |
| EP | 2 025 929 | 2/2009 |
| EP | 2 075 462 | 7/2009 |
| FR | 2 707 754 | 1/1995 |
| GB | 2 105 846 | 3/1983 |
| GB | 2 284 256 | 5/1995 |
| GB | 2295670 A | 6/1996 |
| GB | 2 326 471 | 12/1998 |
| GB | 2 398 841 | 9/2004 |
| GB | 2 409 517 | 6/2005 |
| GB | 2 421 075 | 6/2006 |
| GB | 2 428 748 | 2/2007 |
| GB | 2 440 953 | 2/2008 |
| GB | 2 440 954 | 2/2008 |
| GB | 2 440 955 | 2/2008 |
| GB | 2 446 433 | 6/2010 |
| JP | 55-69006 | 5/1980 |
| JP | 58153107 A | 9/1983 |
| JP | 60-100707 | 6/1985 |
| JP | 10-69922 | 3/1989 |
| JP | 6-117914 | 4/1994 |
| JP | 2000-111319 | 4/2000 |
| JP | 2003-302536 | 10/2003 |
| JP | 2007-114072 | 5/2007 |
| LV | 11378 | 8/1996 |
| LV | 11389 | 8/1996 |
| SU | 780 654 | 3/1996 |
| SU | 577 394 | 10/1997 |
| WO | 97/15805 | 5/1997 |
| WO | 00/23764 | 4/2000 |
| WO | 00/28294 | 5/2000 |
| WO | 00/39548 | 7/2000 |
| WO | 01/33075 | 5/2001 |
| WO | 02/053910 | 7/2002 |
| WO | 03/076887 | 9/2003 |
| WO | 2005/024349 | 3/2005 |
| WO | 2005/071382 | 8/2005 |
| WO | 2005/071383 | 8/2005 |
| WO | 2006/021751 | 3/2006 |
| WO | 2006/063990 | 6/2006 |
| WO | 2006063463 A1 | 6/2006 |
| WO | 2007/099290 | 9/2007 |
| WO | 2007/104306 | 9/2007 |
| WO | 2008/101496 | 8/2008 |
| WO | 2009/046717 | 4/2009 |

OTHER PUBLICATIONS

International Search Report from counterpart PCT Application No. PCT/DK2011/050028 mailed on May 17, 2011 (3 pages).

Gareth John; Search Report issued in Great Britain Application No. GB0812037.0; Sep. 16, 2008; 4 pages; Great Britain Intellectual Property Office.

P. Ganci; International Search Report issued in International Application No. PCT/GB96/02606; Jan. 28, 1997; 2 pages; European Patent Office.

Robert Macdonald; Combined Search and Examination Report issued in Great Britain Application No. GB0812258.2; Nov. 7, 2008; 6 pages; Great Britain Intellectual Property Office.

Christopher Smith; Search Report issued in Great Britain Application No. GB0814651.6; Dec. 4, 2008; 1 page; Great Britain Intellectual Property Office.

Tony Oldershaw; Examination Report issued in Great Britain Application No. GB0814651.6; May 1, 2009; 2 pages; Great Britain Intellectual Property Office.

Tony Oldershaw; Combined Search and Examination Report issued in Great Britain Application No. GB0817341.1; Jan. 12, 2009; 4 pages; Great Britain Intellectual Property Office.

David Biloen; International Search Report and Written Opinion issued in International Application No. PCT/IB2009/007018; Oct. 7, 2010; 6 pages; European Patent Office.

Lars Jakobsson; International Search Report issued in International Application No. PCT/NO03/00087; Jun. 10, 2003; 3 pages; European Patent Office.

Tony Oldershaw; Combined Search and Examination Report issued in Great Britain Application No. GB0822930.4; Mar. 26, 2009; 5 pages; Great Britain Intellectual Property Office.

James Paddock; Combined Search and Examination Report issued in Great Britain Application No. GB0913739.9; Nov. 30, 2009; 4 pages; Great Britain Intellectual Property Office.

Daniel Jones; Combined Search and Examination Report issued in Great Britain Application No. GB1004162.2; Sep. 13, 2010; 8 pages; Great Britain Intellectual Property Office.

Mike Walker; Combined Search and Examination Report issued in Great Britain Application No. GB1001855.4; Mar. 22, 2010; 7 pages; Great Britain Intellectual Property Office.

(56) References Cited

OTHER PUBLICATIONS

David Biloen; International Preliminary Report on Patentability issued in International Application No. PCT/IB2009/007018; Mar. 7, 2011; 9 pages; European Patent Office.

Christoph Felicetti; International Search Report and Written Opinion issued in International Application No. PCT/EP2009/008934; Apr. 27, 2010; 11 pages; European Patent Office.

Jonathan Charles Teixeira Moffat; Office Action issued in U.S. Appl. No. 13/119,871, filed Jun. 30, 2011; 23 pages; U.S. Patent and Trademark Office.

Jonathan Charles Teixeira Moffat; Office Action issued in U.S. Appl. No. 13/119,871, filed Dec. 13, 2011; 18 pages; U.S. Patent and Trademark Office.

\* cited by examiner

WIND TURBINE OPTICAL WIND SENSOR

The present invention relates to a wind energy power plant, and in particular to a wind turbine optical wind sensor.

FIG. 1 illustrates a wind energy power plant such as a wind turbine 1. The wind turbine 1 comprises a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm for example. In the latter case, the diameter of the rotor could be as large as 100 meters or more.

In order to safely and efficiently extract energy from the wind, many wind turbines include anemometers or wind sensors that provide information about the incident wind speed and direction. Such information is useful for monitoring the amount of wind available at the site for energy generation purposes. Knowing the wind direction allows the yaw of the wind turbine nacelle to be adjusted so that the rotor blades face fully into the incident wind during times of energy production. Further, knowing the speed of the wind allows the pitch of the rotor blades to be adjusted so that the amount of energy extracted from the incident wind can be carefully controlled to meet demand and satisfy other operational parameters. It is often necessary, for example, to angle the plane of the wind turbine rotor blades out of the wind, or to adjust the pitch of the rotor blades to spill the wind, to avoid structural problems or electrical overloads associated with wind speeds that are too high.

Accurate information regarding wind speed and direction is therefore a crucial input in wind turbine control and monitoring systems, such as the SCADA system.

The operational environment in which wind turbine wind sensors are deployed can be severe and is often the main cause of many sensor operational difficulties. Mechanical anemometers, for example, are liable to fail through the accumulation of dirt and ice on their moving parts. While electrical or laser based wind sensors, such as those based on LIDAR (Light Detection and Ranging) apparatus are more capable of withstanding dirt and ice, they are more susceptible to damage from lightning strikes that frequently trouble wind turbines due to their height and location in stormy locations.

The use of lighting conductors provides one way of drawing the energy from a lightning strike away from sensitive equipment. However, lighting conductors will not always adequately protect sensor equipment, which by reason of including metallic components such as wiring and circuits, is equally receptive to damage from an electrical discharge and induced currents.

We have therefore appreciated that there is a need for a wind energy power plant having a sensor that can accurately provide information about the incident wind for control and monitoring purposes, and that can reliably operate despite the challenges referred to above.

SUMMARY OF THE INVENTION

The invention is defined in the independent claims to which reference should now be made. Advantageous features are set out in the dependent claims.

In a first aspect, a wind turbine optical wind sensor apparatus is provided. The wind turbine optical wind sensor apparatus comprises: a first light source, wherein the first light source is arranged to emit multiple beams of light as a first sensor beam, the first sensor beam comprising two or more individual beams of light, and wherein each individual beam of light has a different frequency characteristic in comparison to at least one other individual beam of light in the sensor beam; a first light receiving device coupled to an optical sensor for detecting flashes of light, caused as matter carried in the wind passes through the individual beams of light and reflects light towards the light receiving device; a focussing device for focussing the individual beams of light in the multiple beams of light at respective focal points in the vicinity of the first light receiving device, such that the focal points of the individual beams are adjacent one another; and a controller, coupled to the optical sensor, for processing the flashes of light detected by the optical sensor to determine the speed and/or direction of motion of the matter and the wind in which the matter is carried.

The multiple beam of light comprises individual beams of light having different frequency characteristics. This allows the controller to determine from the frequency characteristic of the reflected light the order in which the beams of light are triggered, and therefore the direction in which the wind is blowing.

Preferably, the wind turbine optical wind sensor apparatus comprises: at least a second light source arranged to emit at multiple beams of light as at least a second sensor beam, the multiple beams of light comprising two or more individual beams of light, and wherein each individual beam of light has a different frequency characteristic in comparison to at least one other individual beam of light in the at least a second sensor beam; a focussing device for focussing the individual beams of light in the at least a second multiple beams of light at respective focal points in the vicinity of the first or at least a second light receiving device, such that the focal points of the individual beams are adjacent one another; and wherein the first light source and the at least a second light source are arranged such that each multiple beam of light provides a sensor beam orientated in a direction that is at least partly orthogonal to the other sensor beams.

By arranging multiple sensor beams at least partly orthogonally to each other, the direction in which the wind is blowing can be calculated for any direction of wind.

In one embodiment, the wind sensor comprises three light sources emitting respective multiple beams of light to define three respective sensor axes orientated at equal angular separations from one another. In an alternative embodiment, the wind sensor comprises five light sources emitting respective multiple beams of light to define five respective sensor axes orientated at equal angular separations from one another. Five sensor axes allows an accurate measurement of the wind direction irrespective of angle, with measurements along two of the sensor axes being used to check the measurement result. An embodiment with only three sensor axes achieves a similar measurement, but without the cross-check and at a lower equipment cost.

In one embodiment, the sensor beams are arranged to intersect, and the wind turbine optical wind sensor apparatus comprises a single light detection device at the intersection point of the beams.

It is advantageous if each light source comprises an optical fibre connected to an opto-electronic light source, and the opto-electronic light source is housed in an electrically shielded part of the wind turbine. This allows those elements of the sensor system that are vulnerable to lightning to be protected, and to have the components that are exposed to the elements to be made entirely of non-metallic, non electrically conductive material.

In one embodiment, therefore, the optical sensor is a photo electric detector housed in an electrically shielded part of the wind turbine, and the light receiving device and its coupling to the photo electric detector are non-electrically sensitive, and in a further embodiment, the wind sensor comprises one or more electrically sensitive components housed in an electrical shielded part of the wind turbine, and wherein the elements of the wind turbine external to the nacelle are electrically insensitive.

Advantageously, the optical fibre of each light source is attached to the same opto-electronic light emitter. This improves the cost-effective and design simplicity of the sensor system as each single light source fibre, can carry the plurality of individual beams of light having different frequency characteristics.

In one embodiment, the frequency characteristics of the individual beams of light in each sensor beams are different to the frequency characteristics of the individual beams of light in the other sensor beams. This allows the controller to determine from the reflected light alone, which of the sensor beams and individual beams were triggered, and therefore which sensor axis orientation corresponds to that beam.

In one embodiment, the frequency characteristic is the optical wavelength of the light in the individual beams. Additionally, the individual beams may be arranged to blink and the frequency characteristic is the blink frequency.

In one embodiment, the wind sensor controller is operable to activate one of the light sources to generate one multiple beam of light at a time. This allows the wind sensor to detect which beam the particles are passing, in a straightforward way.

In one embodiment, each multiple beam of light comprises only two individual beams of light having different respective wavelengths. This embodiment benefits from being straight forward to implement, while still giving the full advantages of indicating the direction from the beam colour.

In an alternative embodiment, each multiple beam of light comprises three or more individual beams of light having different respective wavelengths. This embodiment can be used to provide a stronger signal, where this is required.

The individual beams may be optically distinguishable wavelengths of visible light, for ease of detection and error finding.

A corresponding method of operating the optical wind turbine wind sensor, and a computer program product for operating the optical wind turbine wind sensor mentioned above are also provided.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENTS

Figure 1:
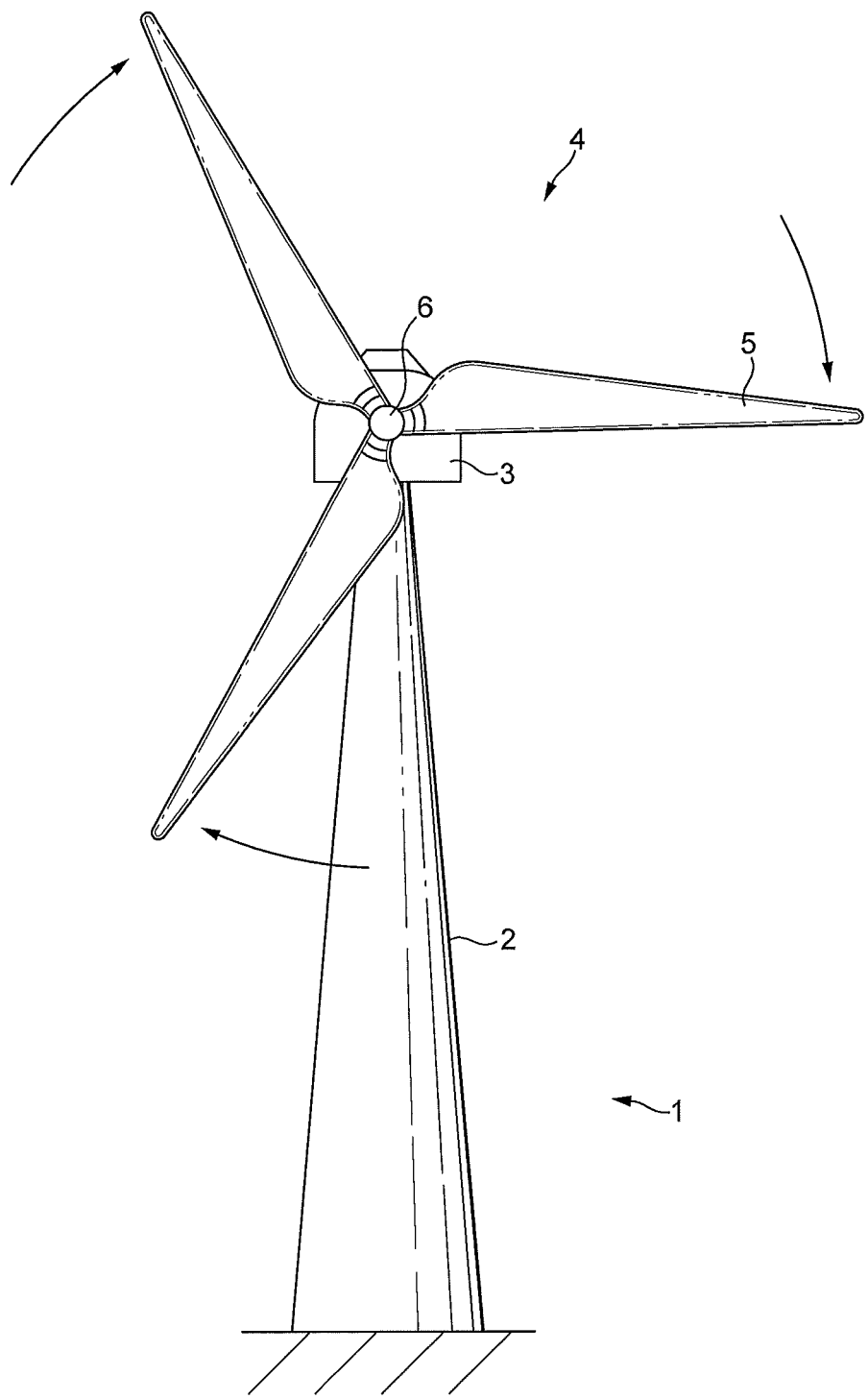
FIG. 1 is a schematic exterior view of a wind turbine.
Figure 2:
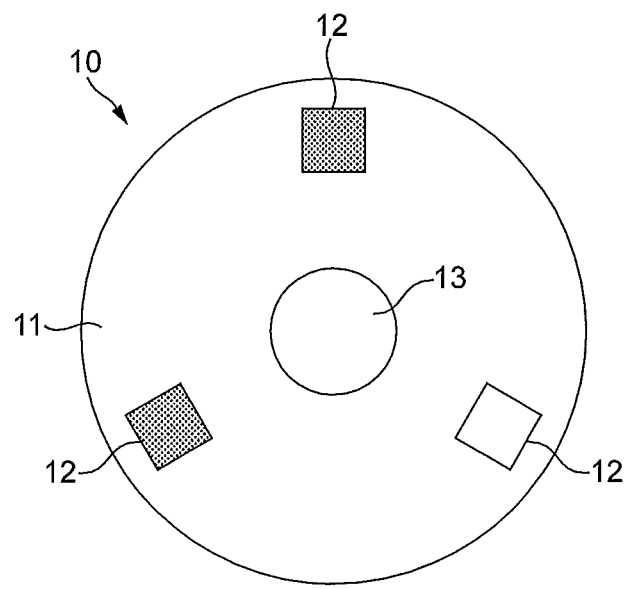
FIG. 2 is a schematic elevation view of the wind turbine wind sensor according to an example of the invention.
Figure 3:
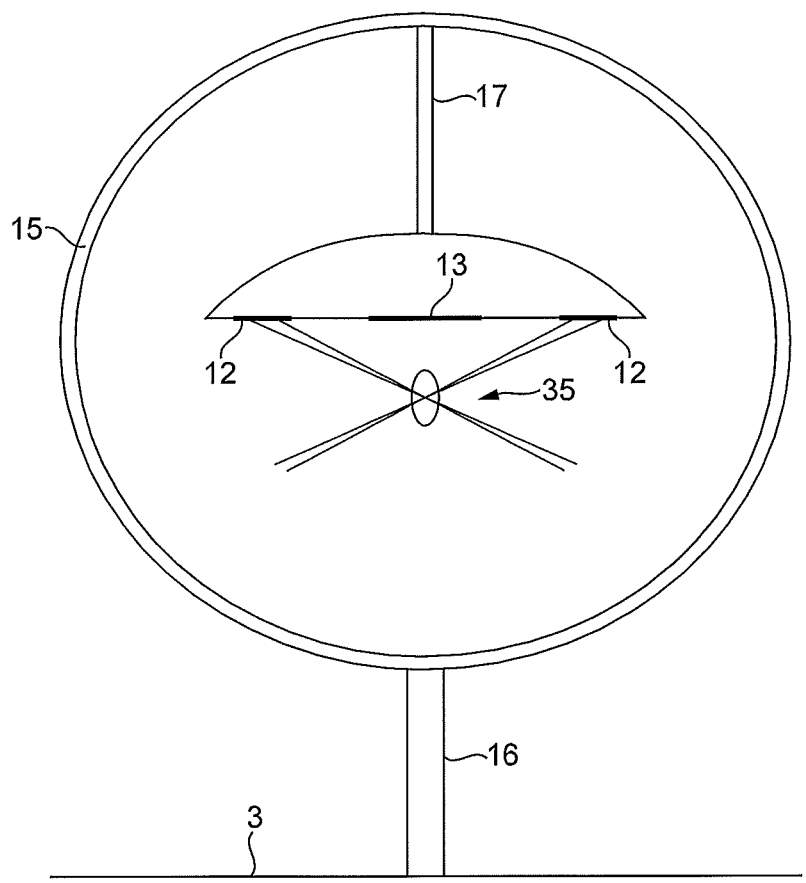
FIG. 3 is a schematic side elevation view of the wind turbine wind sensor according to an example of the invention shown in FIG. 2.

In general terms, an example embodiment of the invention comprises a wind turbine having an optical wind sensor 10. The optical wind sensor generates one or more multiple beams of light, each of which forms a sensor beam pointing along a sensor axis. Where more than one sensor beam is used the beams are arranged so that the different sensor axes lie at least partly orthogonal to each other, allowing the wind direction to be detected for any direction of wind. Each multiple sensor beam comprises at least two individual sensor beams having different respective wavelengths of light. The different colour of the individual light beams allows the sensor system to detect which of the light beams is triggered first when matter in the wind passes through the beam and reflects light back to light collecting device. Reference should now be made to FIGS. 2 and 3 which illustrate a first example embodiment of the invention. FIG. 2 shows the wind sensor 10 viewed from underneath, while FIG. 3 shows the wind sensor 10 from the side.

The wind sensor 10 includes a housing 11, in which a number of light sources 12 and a light detection apparatus 13 are situated. In the diagram three light sources 11 are illustrated though in practice there may be any number. As will be explained later, an odd number is more likely due as it provides an optimal arrangement of sensor beams, although the invention is not limited to such usage. Three light sources for example allow the wind speed and direction in at least two directions to be calculated accurately. The housing may be constructed from a material such as plastic with fibre reinforcements of fibreglass or carbon; alternatively the material may be a deformable material such as a polymer, e.g. rubber, natural rubber, polypropylene, polyethylene, nylon, elastomers, kevlar, or the like.

FIG. 3 shows a preferred mounting structure to secure the housing 11 to the wind turbine nacelle 3. In this embodiment, a halo-like or annular shield element 15 is attached to the top of the wind turbine nacelle 3 by means of pole or rod 16. The sensor housing 11 is suspended inside the annular shield element 15 by a connecting portion 17. The annular shield element 15 can be made of metal or other conductive material so that, in the case of a lightning strike, the lightning is attracted to the shield 15 and away from any potentially sensitive equipment in the sensor housing 11. Lighting conductors can therefore be incorporated in the annular shield to channel the energy from the lightning strike from the shield 15 safely into an appropriate circuit in the wind turbine nacelle 3 and from there to ground. The connection portion 17 is preferably made from a similar material to the sensor housing 11, or the wind turbine nacelle 3, such as plastic material with fibre reinforcements of fibreglass or carbon, a deformable material such as a polymer, e.g. rubber, natural rubber, polypropylene, polyethylene, nylon, elastomers, kevlar, or the like. The connection portion 17 is reinforced with carbon fibre or other material as appropriate so that the sensor housing 11 is securely supported in position. The rod 16 is preferably made from the same or similar material to the exterior of the wind turbine nacelle 3.

As will be described in more detail with reference to FIG. 4, the sensor housing 11 in the preferred example does not contain any metallic or conductive elements therefore significantly reducing the risk of a lightning strike.

In an alternative embodiment, the housing may simply be attached to the wind turbine by supports or leg structures (not shown) instead of the annular shield 15. The arrangement shown in FIG. 3 is advantageous however as it allows the sensor housing 11 to be more easily location above the nacelle 3 at a preferred location for making wind speed measurements, that is at a location where the disturbing effects on wind flow from the rotor 5 or wind turbine nacelle 3 have been found to be at a minimum, while also minimising any aerodynamic disturbance on the wind from the sensor apparatus 10 itself.

As shown in FIG. 3, the light from light sources 12 is focussed at focal point 35 a small distance in front of the light detection apparatus 13. The ability of the light detection apparatus 13 to capture information from the light can be improved in certain circumstances by attaching a dark plate or surface to the wind turbine nacelle 3 directly underneath the focal point 35.

Figure 4:
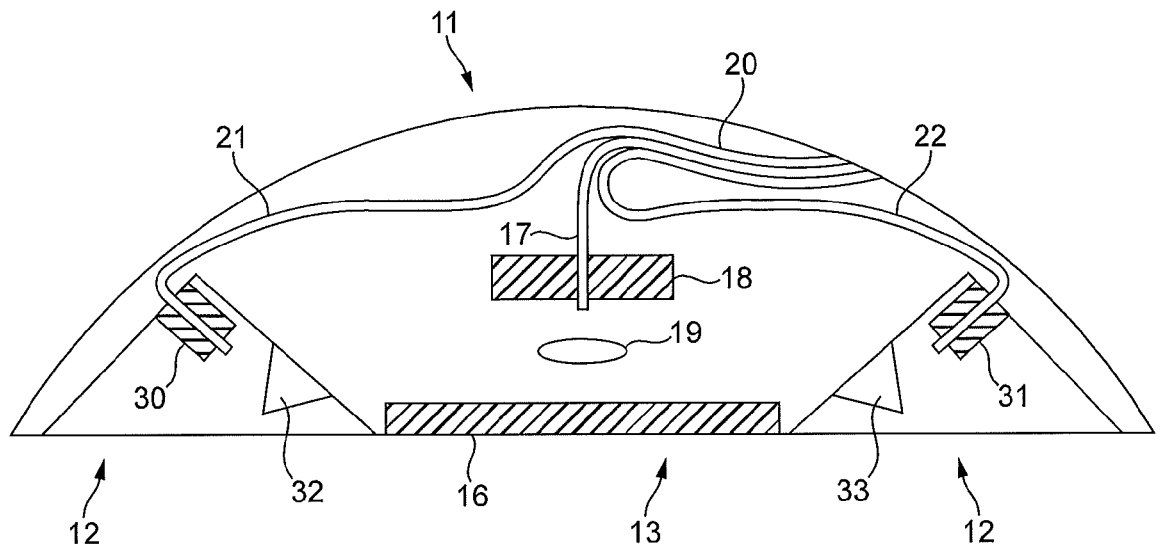
FIG. 4 is a more detailed illustration of the wind sensor housing shown in FIG. 2.

With reference to FIG. 4, the components of the sensor housing 11 will now be described in more detail. The light detection apparatus 13 preferably comprises a collecting lens 16 and associated optical fibre 17. The collecting lens 16 has a large aperture for capturing light, and in the example described herein, may have a size in the range of 5 to 10 cm. In other implementations, the size of the lens may be scaled appropriately.

The optical fibre 17 is fixed inside the housing 11 by a mount 18, that positions the optical fibre so that it can receive the light collected by the lens 16. An additional optical lens 19 can be provided between the collecting lens 16 and the end of the optical fibre 17 if it becomes desirable to increase the proportion of the light captured by the optical fibre 17.

Figure 5:
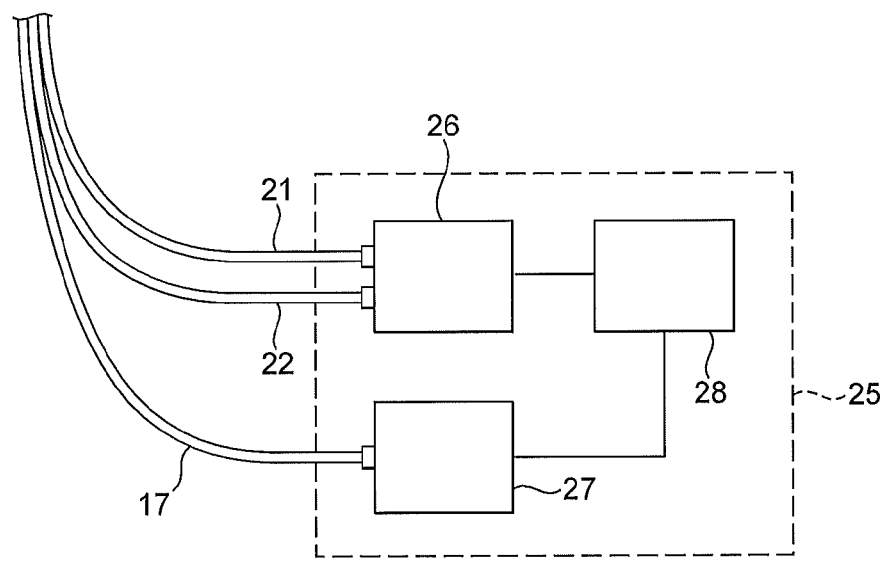
FIG. 5 is a schematic illustration of further apparatus used with the wind sensor.

Optical fibre 17 is part of the optical fibre bundle 20, which comprises further optical fibres 21 and 22. The optical fibre bundle 20 passes from the housing 11 into the interior of the nacelle 3 via the interior of connection portion 17, annular shield 15, and support rod 16 to connect to opto-electronic equipment suite 25, illustrated in FIG. 5.

The opto-electronic equipment suite 25 comprises one or more opto-electronic light sources 26, one or more light detectors such, as photo sensor 27, and a controller 28. The opto-electronic light sources can include one or more LEDs, lasers, halogen or metal halide source connected to the optical fibres 21 and 22. Additionally, the end of optical fibre 17 is connected to the light detector 27. The controller 28 includes a memory and a processor on which control software is stored to control the optical wind sensor, and analyse the results.

Referring again to FIG. 4, the light sources 12 comprise at least one optical fibre, such as optical fibres 21 and 22 connected to the opto-electronic light source 26. The optical fibres 21 and 22 are held in place by respective mounts 30 and 31. The light sources 12 also comprise one or more optical elements 32 and 33 arranged in front of the end of the optical fibre for receiving output light. Optical elements 32 and 33 can comprise one or more of an optical prism and lens, as will be discussed in more detail in connection with the examples below.

The operation of the wind sensor will now be described in more detail with reference to FIGS. 6 to 13.

Figure 6:
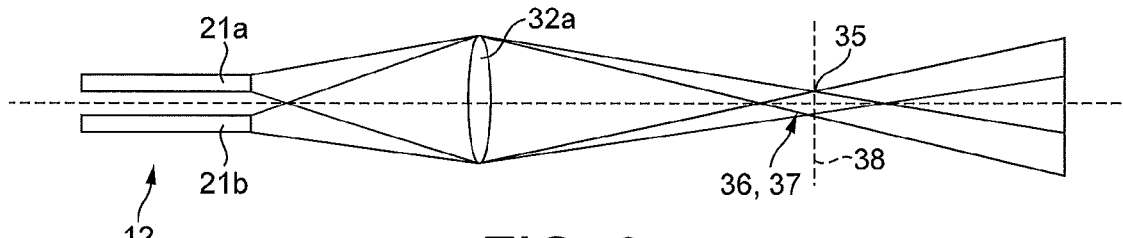
FIG. 6 is a simplified diagram of a first example of the light source apparatus shown in FIG. 4 in a first example.

In the example shown in FIG. 6, each light source 12 outputs light at two distinct wavelengths. This is illustrated by the two optical fibres 21a and 21b, that are substantially aligned with one another, and which each emit a beam of light substantially in the same direction. The beams are therefore substantially parallel. Of course, it is not necessary to have each light beam produced by a separate optical fibre, and an example using only a single fibre per light source 12 (as illustrated in FIG. 4) will be described below.

The two beams of light, having respective wavelengths $\lambda 1$ and $\lambda 2$, are directed onto the optical element 32, in this case a lens 32a, which focuses each beam at a focal region 35 some distance in front of the lens 32a. The focal region 35 is made to lie in front of the lens 16 in the light detection apparatus 13, shown in FIG. 4. The arrangement can also be seen in FIG. 3. The diameter of the focal point 35 of the beams can in this example be in the range 5 mm to 20 mm.

Within the focal region 35 each beam has a separate focal point 36 and 37. The focal points 36 and 37 are made to fall along the sensor axis 38, with a prescribed separation between each focal point. The separation of the adjacent focal points can for example be in the range 0.1 mm to 10 mm.

The wind sensor operates by detecting flashes of light from each sensor beam, as particles of matter carried in the wind, pass through the focal region 35 and reflect the light from each beam towards the lens 16. Air, of normal quality, typically comprises a sufficient quantity of such matter for the transit of particles to be detectable, providing a suitable wavelength of the light is chosen, and particles of water vapour, dust or pollen can easily be detected in this way.

Figure 7:
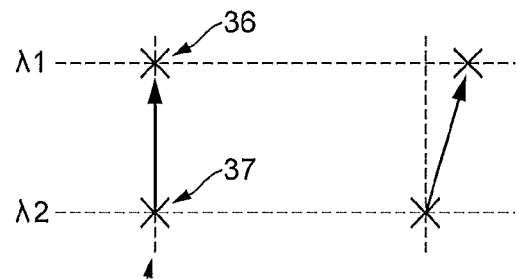
FIG. 7 is a first diagram illustrating a detection principle.

FIG. 7 illustrates the principle in more detail. The left hand side of FIG. 7 illustrates the flash of light (denoted by an X) at each beam's focal point 36 and 37, occurring as a particle in the air travels along the sensor axis 38 in this cases in the upwards direction. Assuming that the separation between the two beam focal points 36 and 37 is a few mm, then the flash at focal point 37 will occur marginally before the flash at focal point 36. Assuming that the wind speed is a few tens of meters per second, the time between flashes will be less than a millisecond. This transit time ultimately needs to be measured if the speed of the particle, and the wind in which it is carried, is to be understood.

If the light of each beam were to have the same frequency characteristic such as wavelength, then in practical terms the only information available from the light flashes would be the time of transit. It might be possible to attempt to detect which beam is triggered first, and therefore deduce the direction in which the particle is moving, but this requires high resolution equipment and processing, leading ultimately to more cost.

These difficulties are alleviated in the present example of the invention by the use of beams of different wavelengths. The different wavelengths allow the processing equipment to determine which beam is triggered first, not by a visual analysis of the spatial position at which the flash originated, but based on the colour of the flash, and the order in which the flashes occur. For a particle moving from top to bottom as in the example of FIG. 7, the sensor will therefore see two flashes of colour $\lambda 1$ and $\lambda 2$ and may deduce the direction of travel from the order $\lambda 2$, $\lambda 1$.

Figure 8:
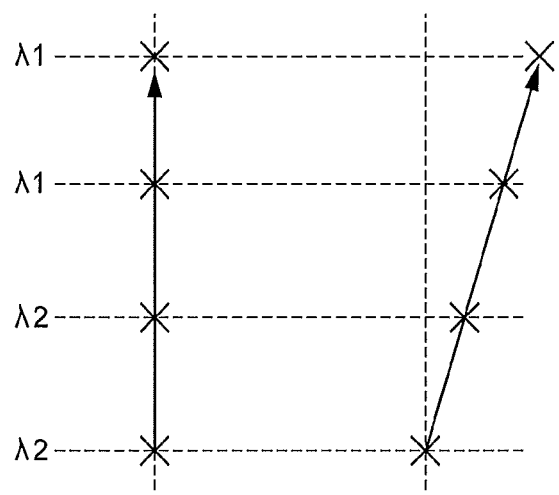
FIG. 8 is a second diagram illustrating a detection principle.

A slight modification to the example is shown in FIG. 8, in which third and fourth beams are also used for detection. In this example, the additional beams have the same wavelength as the first and second beams, and may therefore be generated by one or more beam splitters incorporated in the optical elements 32 coupled to each of the respective optical fibres 21*a* and 21*b*.

The advantage of using four beams is that the transit of a particle is then indicated by four flashes of different colour that occur at equally spaced intervals in time. This makes the signal for a particle transit stronger than the case of just two flashes, and therefore easier to distinguish from background noise. For example, if one of the flashes of reflected light in the four is not as strong as the others, the presence of the flashes either before or after (providing these occur at the correct timing), allows particle transit to be detected with some certainty despite the missing or weakened individual flash. With just two flashes, the absence of a strong signal for even just one of the flashes can introduce a great deal of uncertainty into the detection.

Furthermore, the use of four beams increases the distance that the particle has to travel, increasing its transit time, and therefore improving the accuracy in the measurement of particle speed. The order in which the beams are arranged is not consequential, providing the arrangement is not symmetric and can so be used to determine direction. Having said that, grouping the beams together by wavelength is preferred, such as $\lambda 1$, $\lambda 1$, $\lambda 2$, $\lambda 2$, as shown in the Figure, as it makes the directional part of the resulting signal stronger. Of course, any number of beams may be used in the sensor, as desired.

Figure 9:
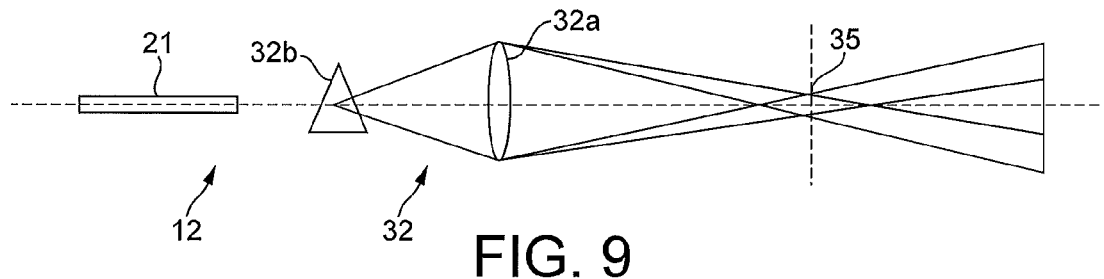
FIG. 9 is a simplified diagram of the light source apparatus shown in FIG. 4 in a second example.

FIG. 9 illustrates a second example of light source apparatus, which is advantageous where a number of light beams with different wavelengths are to be used in the sensor. The light source comprises a single optical fibre 21 connected to the opto-electronic light source 26 as before. A plurality of different beams of light, each with a different wavelength, are input into the optical fibre and are transmitted along its length as a composite beam. On emerging from the optical fibre 21, the composite beam is directed at an optical prism 32*b*, included in optical element 32, which splits the beam into a separate beam for each of its respective component wavelengths. The optical prism 32*b* directs the individual beams onto the optical lens 32*a* as before. Using this arrangement, any number of beams of different wavelength may easily be used in the sensor.

In the preceding discussion, the time of transit measured by the sensor and used to determine wind speed, assumed that the particle travelled in a straight line along the sensor axis 38. As shown to the right of FIGS. 7 and 8, if the particle and indeed the wind, travel along a path slightly deviated from the sensor axis, they would appear to be travelling more slowly as far as the individual sensor is concerned. A deviation angle of around 45° for example in the direction of the path compared to the sensor axis, results in an apparent reduction in speed of around 40% compared to the actual value.

In some respects this source of error is alleviated through focussing of the beams on the sensor axis 38. That is to say that particles passing along the sensor axis will cut the beams at the focal points 36 and 37. The light beam at these points is tightly defined, and the reflection from the particle as it passes will therefore also be tightly defined and distinct. As the particle moves away from the sensor axis 38, then it moves into a region where the beams are no longer in focus. As a result, the flash will be bigger but less distinct. This change in size and nature of the flashes detected by the detector 27 can be used to detect when particles are not travelling close enough to the sensor axis 38 for the results to indicate reliably the speed and direction. Of course, as the particle moves further away from the sensor axis 38 it will gradually fade from view. As a result, blurry representations of the particles can simply be ignored until clear flashes are detected that can be used in the subsequent processing steps.

In some embodiments this difficulty can be alleviated by orientating the sensor correctly with respect to the wind before use, averaging the results obtained from the particle transit times, and discarding the largest or most outlying values. In practice however, it is preferred if a plurality of light sources 12 are used, with each sensor facing in a different direction, such as shown in FIG. 2, so that the effect on one sensor is cancelled or compensated for by the others. The use of the plurality of sensors will now be described in more detail.

Figure 10:
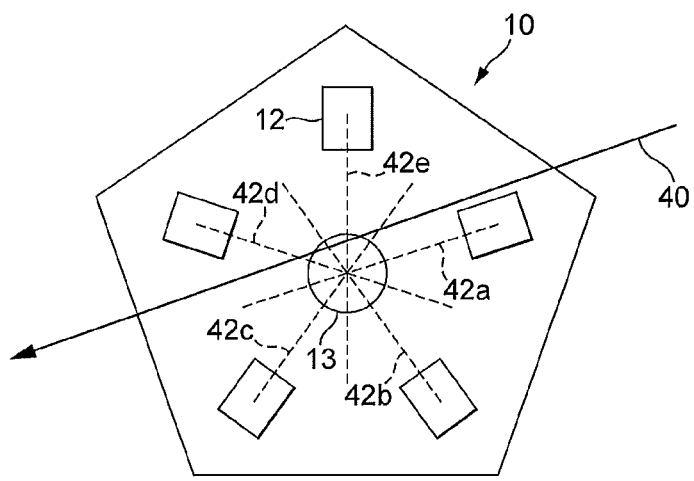
FIG. 10 is a simplified diagram of the operation of a plurality of light source apparatus operating together to detect the wind speed and direction.

FIG. 10 illustrates further the arrangement of the light sources and light detection apparatus of FIG. 2, indicating the direction of the wind by the arrow 40. In this sensor system, five sensor beams are employed 42*a*, 42*b*, 42*c*, 42*d* and 42*e* defining intersecting sensor axes A, B, C, D and E. Five intersecting beams are used in order to fully determine the direction and speed of the wind in the two directional plane, and to ensure that there are always at least two strong signals received by the light detector. Each sensor beam gives as an output a time of transit for particles in the air passing across the beam, and based on the time outputs, the controller 28 calculates the beam direction, and provides an output.

The operation of the sensor will now be described in more detail with reference to FIG. 11.

Figure 11:
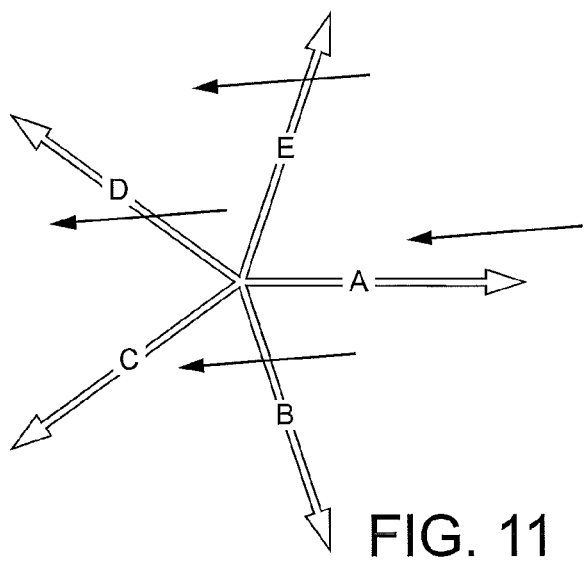
FIG. 11 illustrates the arrangement of the sensor axes in an example embodiment of the invention.
Figure 12:
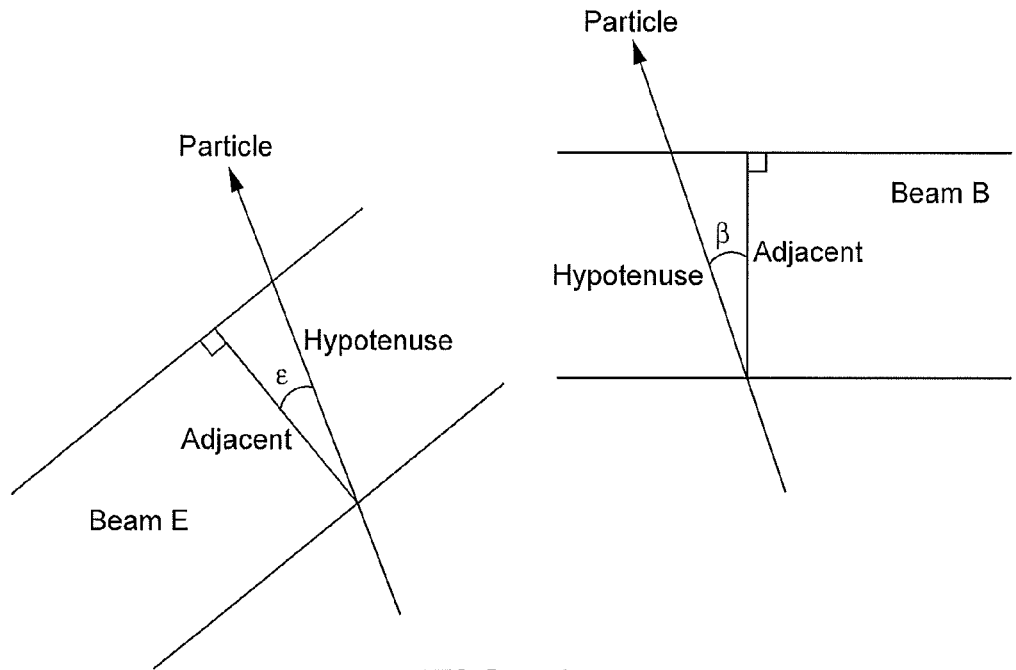
FIG. 12 illustrates the basis for the calculation in respect of the two sensor beams.

For the purposes of illustration, FIG. 11 omits the sensor system and shows only the five sensor axes, A, B C D and E. As will be explained, at any given time only three sensor beams of the five are actually needed, although the two remaining beams do provide a cross-check function.

The sensor beams are arranged to define five sensor axes A to E separated from one another by equal angular displacements. In this case, as there are five beams, the angular displacement is 72 degrees, and the difference in angle between the opposed axes, for example B and E, is 144 degrees or 36 degrees expressed as an acute angle. It is assumed that all sensor beams have the same width.

For nearly all wind directions, the time of transit of a particle across the sensor beam will be different for each of the sensor beams. However, when the wind direction is largely parallel to a sensor axis, the times of transit indicated by the sensor beams arranged on the two adjacent sensor axes will be largely identical. If, as illustrated in the diagram, the wind direction is mostly parallel to sensor axis A, then the angle at which particles in the wind will cross the sensor beams arranged along axes B and E will be equal, namely (90−72) 18 degrees to the perpendicular. As a result, the times of transit indicated by beams B and E will be largely the same.

In this case, sensor axis A which is substantially parallel to the direction of particulate travel, will give no useful signal as any particles in the incident wind will spend too short a time in the focussed region 35 of the beam to be detected as individual particles. Instead, diffuse flashes of light will be detected as different particles cross the focussed region and are illuminated.

It will be appreciated also, that in this case the times of transit of particles in the wind across the beams lying along sensor axes C and D will also be largely identical, as the angles made by the particles to the beam directions will also be the same. However, in the case of the sensor beams lying along axes C and D, the angle of transit is closer to a direction parallel to the sensor axis, meaning that the particle is likely to pass more quickly from the focussed region of the beam into the unfocussed region. This may result in a signal that is less reliable that for the beam sensors where the angle of transit is closer to the perpendicular, and where the time of transit is lower.

In this special case, it is straight forward to determine the direction of the incident wind as being along the direction of the sensor axis A. The direction of the wind along the sensor axis A is given by the detected particle direction as it passes sensor axes B and E.

It will be appreciated that the angles of transit for the two sensor axes with the lowest time of transit adds up to 36 degrees because of the arrangement of the beams and the observation that time of transit for the next but one sensor beams are the same when the wind direction lies principally along the intermediate sensor axis. In the example described above, this observation corresponds to a cone of 36 degrees centred on the sensor axis A. While the wind direction lies between an angle of 0 degrees to the sensor axis A (parallel) and an angle of 18 degrees, the direction can be indicated by the transit times obtained from the beams lying along sensor axes B and E. If the wind direction crosses the line indicating 18 degrees deviation from the sensor axis A, then it will now lie within an 18 degrees angle of the opposite sensor axis C, and will be given by the times of transit of beams lying along opposite sensor axes B and D.

The same mode of operation also applies in situations in which the direction of the incident wind is not substantially parallel to a sensor axis, but deviates. In such cases, consideration is given to the two sensor axes that give the two lowest time signals. For the case discussed above, this will be sensor axes B and E as before, since as these sensor axes are the most perpendicular to the wind direction, the time of transit will be the least.

For sensor axes B and E the times of transit will not be identical, but will reflect the relationship between the incident wind direction and the angles made by particles in the incident wind to the respective sensor axes. When the transit times are identical, the respective angles of transit are 18 degrees for each sensor, and the total of the angles is 36 degrees. In cases where the times are not identical, the total of the angles of transit will still be 36 degrees, since as the wind way from one sensor axis (for example sensor axis B) it moves towards the other (for example sensor axis E).

In this more general case, the exact angle of incidence of the incident wind, can be calculated by trigonometry. The path of a particle across the beam is the hypotenuse in a right angled triangle, with the beam width as the adjacent. The angle of transit is given by the angle between the adjacent and the hypotenuse.

As will be appreciated from FIGS. 7 and 8, the shortest time of transit of a particle in the incident wind across a sensor beam will occur when the angle of transit relative to the width of the beam is zero degrees, namely when it is perpendicular to the beam. In this case, the velocity of the wind is given by the expression "time of transit divided by the beam width". As the beam width is known, this is straightforward. In practice however, the data obtained from the sensor beam is a merely time information, which is ambiguous in that a single time value may refer either to a slower time of transit or to a greater angle of transit. It is therefore necessary to solve the equations for the two sensor axes simultaneously.

Figure 13:
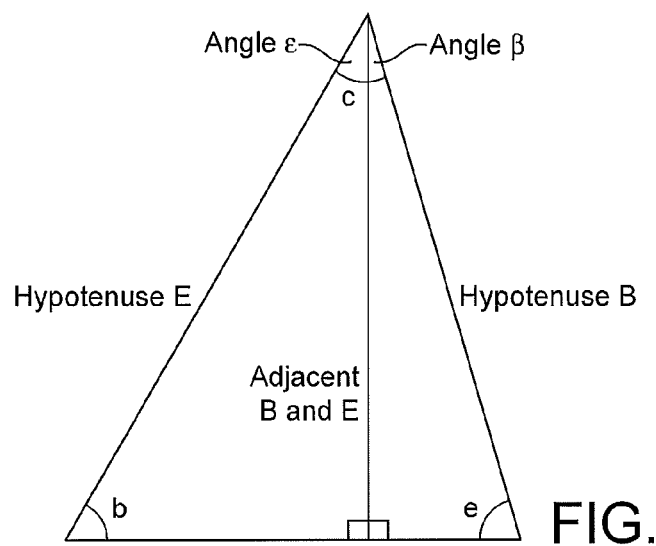
FIG. 13 illustrates the trigonometrical basis for the calculation.

In this case there are two quantities that are the same for each axis, the width of the beam and the velocity of the wind. FIG. 13 illustrates how the simultaneous equations can be constructed, assuming that the path of the passing particle and the width of the beam are viewed as two right angled triangles with a side in common. Referring to the hypotenuse sides as B and E for brevity, and their opposite angles as b and e, then the law of sines gives:

$$\frac{B}{\sin b} = \frac{E}{\sin e} = \frac{C}{\sin c} \qquad [1]$$

Where C is the length of the opposite side, and c is its opposite angle. We can observe from the previous discussion that c=36 degrees, and $$c = \beta + \epsilon$$

where $\beta+\epsilon$ are the unknown angles of transit for sensor beams lying along axes B and E respectively. It will be appreciated from inspection of FIG. 13, that:

$$\beta + e + 90 = 180$$

and $$\epsilon + b + 90 = 190 \qquad [2]$$

The length of side C is given generally by the expression:

$$C = \sqrt{(B^2 + E^2 - 2BE \cos(c))} \qquad [3]$$

As there is a strict relationship between the length of the hypotenuse and the transit times of the particle, the relation between the transit times is equal to the relationship between the hypotenuses.

Time $B$/Time $E$=Hypotenuse $B$/Hypotenuse $E$

Thus in equation 1, as angle c is known, and the values for B and E are known (in terms of the transit time) a value for the length of C (also in terms of transit time) can be calculated.

Using this value of C, the values of angles b+e can be found from expression (1), and once b+e are known, the values of $\beta+\epsilon$ can be deduced from expression 2.

Once the angle of transit $\beta$ for beam B is known then, the length of the hypotenuse and the speed of the wind can be deduced.

Generally, speaking:

$$\cos \beta = \mathrm{Adj}(B)/\mathrm{Hyp}(B)$$

In this expression, Hyp (b) expressed as a unit of time is known. The equation can then be rearranged making Adj (B) the subject for the known values of Cos $\beta$ and Hyp (B) to give the time that the particle would have taken had it crossed the beam perpendicularly. As the beam width is known, the actual velocity of the wind can be determined.

Alternatively, the actual distance value for the beam width can be used in conjunction with the angle to give the actual distance of transit along the hypotenuse, which as the time of transit is known, gives the velocity.

In embodiments with five or more sensor beams, the calculation made on the basis of the two sensor beams is compared with the other beams to check the accuracy. For three sensor beams, the calculation can be carried out in the same way, but without the facility of checking the result.

Processing can be used to improve the operation of the sensor, and identify, for example, events where two different particles are detected on a sensor axis in such a way that they appear to be a single particle travelling at speed along the axis. If not correctly identified and processed, such an event will indicate a wind direction and speed that is different to the true value.

As the sensor 10 operates, a history of data points will be accumulated and can be stored in memory for comparison with instantaneous data readings. This allows each of the instantaneous or current data readings to be screened or filtered for anomalies. A simple example of a method for achieving this is to compare a current data reading with the sensor's current determination of the wind direction. If the data reading is not consistent with the current determined direction, that is it indicates that the wind direction has suddenly changed, the data may be flagged as erroneous and ignored. Similar processing can be carried out using the calculated wind speed.

This processing essentially allows the results to be averaged over time and so improves accuracy.

Any number of sensor beams may be used in embodiments of the invention as desired. In situations where accuracy is desired, more beams may be advantageous. Where cost is an important factor, an embodiment with only three sensor beams can be more efficient. With any number of sensor beams, the respective sensor beams are arranged so that no two beams are parallel to one another, as this merely results in one of the beams being redundant. The sensor is not limited to odd numbers of sensor beams, but where an even number is used there is an inevitable overlap in direction whenever the beams are arranged in parallel to each other.

In practice, each light source apparatus 12 is activated by controller 28 in turn (or may be activated together), so that each of the different sensor beams is individually activated. In this way, the controller determines the time value for each sensor beam without interference from the other beams. Although this means that strictly each beam detects a different particle, the effect on the calculation is negligible given that the sensor beams can operate faster than the wind and therefore the direction of the particulate matter in the wind changes.

Although, in the embodiment described, each of the respective sensor beams are lit separately and distinguished from one another by their respective timings, in alternative embodiments the sensor beams may be distinguished from one another by their respective wavelengths. That is to say, in addition to the individual component beams having different wavelengths in comparison to one another, the individual component beams have different wavelengths in comparison to the individual component beams of other sensor beams. This allows all of the beams to be lit continuously. In this arrangement, the light collecting device 13 could be replaced by individual collection devices located between each light emitting device where the beams are passing.

In another embodiment, the different sensor beams can be lit continuously regardless of whether or not each of the individual beams has a different wavelength. This is achieved by reversing the position of the light detection apparatus 13 and the light sources 12, so that there are multiple light detection apparatus 13 located around the periphery of the sensor housing base 11, and a single or multiple light sources 12 in the centre of the housing 11 arranged to emit the respective sensor beams towards the detection apparatus at the periphery. In this way, a distinct detection apparatus 13 is provided for each sensor axis.

The optical sensor 10 described above gives a reading in a two dimensional plane. Achieving three dimensional data on the wind speed can therefore be achieved by providing a similar sensor apparatus to that described above, but orientating the detection plane vertically. The data output from the two different sensor orientations can then be combined to give a single three dimensional result.

In the examples of the invention described above, the optical wavelength or frequency of the light is used to distinguish one individual sensor beam from another and subsequently provide information concerning the transit direction of the wind. In a further alternative embodiment, the wavelength of the individual beams can be constant, but the beams can be caused to blink on and off and subsequently be distinguished from one another, by their blink frequency.

In order to ensure that particles in the wind are detectable, that is that they do not pass through the beam while the beam is off, the blink frequency should be set sufficiently high. As the wind speed of interest may be of the order of tens of meters per second, and the beam width is of the order of millimeters, the time the particles in the wind may spend in the beam may be less than 50 micro seconds. The blink frequency of the light will therefore need to be of the order of 1 MHz or greater to ensure that the particle transmit can be imaged. Frequencies above 100 MHz may be useful in practice.

At the detector, which in this case may be a single PIN diode for example, the received light from the respective individual beams will add together depending on which of the beams the particle is intersecting and when. However, the sensor signal from each individual beam will have its own signature dependent on its individual blink frequency, allowing the signal from a particular beam to be isolated from the others using filtering. Such filtering may be achieved using traditional band pass filters or more complicated digital optical electronics. When choosing the frequencies of the individual beams care should be taken to avoid harmonics that could disturb the detection, such as when one beam has a frequency that is a multiple of another. By way of example, suitable frequencies in the over 100 MHz range could be 110, 120, 130, 140, 150, 160, 170, 180, 190, 210, 230, 250, 270, 290 MHz and so on. This allows all of the beams to operate continuously, but still allows individual beams to be detected.

The optical wind sensor described above can be used in systems controlling the operation of the wind turbine, such as pitch and yaw control systems, as well as for providing data used in calculating the power curve for the turbine.

For the purposes of illustration, the invention has been described with reference to a number of examples. The invention is not to be limited to these, and variations will be apparent to the skilled person within the definition provided the by the claims.

The invention claimed is:

1. A wind turbine optical wind sensor apparatus, comprising:
    a first light source arranged to emit multiple beams of light as a first sensor beam, the first sensor beam comprising two or more individual beams of light, wherein each individual beam of light has a different frequency characteristic in comparison to at least one other individual beam of light in the sensor beam;
    at least a second light source arranged to emit multiple beams of light as at least a second sensor beam, the multiple beams in the at least a second sensor beam light comprising two or more individual beams of light, wherein each individual beam of light has a different frequency characteristic in comparison to at least one other individual beam of light in the at least a second sensor beam;
    wherein the first sensor beam and the at least a second sensor beam are arranged such that they are at least partly orthogonal to each other and point in different directions at least with reference to a two dimensional detection plane;
    a first light receiving device coupled to an optical sensor for detecting flashes of light, caused as matter carried in the wind passes through the multiple beams of light;
    a first focussing device for focussing the individual beams of light in the first sensor beam at respective focal points in the vicinity of the first light receiving device, such that the focal points of the individual beams are adjacent one another;

at least a second focussing device for focussing the individual beams of light in the at least a second sensor beam at respective focal points in the vicinity of the first or at least a second light receiving device, such that the focal points of the individual beams are adjacent one another; and a controller, coupled to the optical sensor, for processing the flashes of light detected by the optical sensor as matter carried in the wind passes through the first and the at least a second sensor beam, and based on the flashes of both the first and at least the second sensor beam determining both the speed and direction of motion of the matter and the wind in the two dimensional detection plane.

2. The wind turbine optical wind sensor apparatus of claim 1, wherein the wind sensor comprises three light sources emitting respective sensor beams to define three respective sensor axes orientated at equal angular separations from one another.

3. The wind turbine optical wind sensor apparatus of claim 1, wherein the wind sensor comprises five light sources emitting respective sensor beams to define five respective sensor axes orientated at equal angular separations from one another.

4. The wind turbine optical wind sensor apparatus of claim 1, wherein the sensor beams are arranged to intersect, and comprising a single light detection device at the intersection point of the beams.

5. The wind turbine optical wind sensor apparatus of claim 1, wherein each light source comprises an optical fibre connected to an opto-electronic light source, wherein the opto-electronic light source is housed in an electrically shielded part of the wind turbine.

6. The wind turbine optical wind sensor apparatus of claim 5, wherein the optical fibre of each light source is attached to the same opto-electronic light emitter.

7. The wind turbine optical wind sensor apparatus of claim 1, wherein the optical sensor is a photo electric detector housed in an electrically shielded part of the wind turbine, and the light receiving device and its coupling to the photo electric detector are non-electrically sensitive.

8. The wind turbine optical wind sensor apparatus of claim 1 wherein the wind sensor comprises one or more electrically sensitive components housed in an electrical shielded part of the wind turbine, and wherein the elements of the wind turbine external to the nacelle are electrically insensitive.

9. The wind turbine optical wind sensor apparatus of claim 1, wherein the frequency characteristics of the individual beams of light in each sensor beam are different compared to the frequency characteristics of the individual beams of light in other sensor beams.

10. The wind turbine optical wind sensor apparatus of claim 1, wherein the frequency characteristic is the optical wavelength of the light in the individual beams.

11. The wind turbine optical wind sensor apparatus of claim 1, wherein the individual beams are arranged to blink and the frequency characteristic is the blink frequency.

12. The wind turbine optical wind sensor apparatus of claim 1, wherein the controller is operable to activate one of the light sources to generate one sensor beam of light at a time.

13. The wind turbine optical wind sensor apparatus of claim 1, wherein each multiple beam of light comprises only two individual beams of light having different respective wavelengths.

14. The wind turbine optical wind sensor apparatus of claim 1, wherein each multiple beam of light comprises three or more individual beams of light having different respective wavelengths.

15. The wind turbine optical wind sensor apparatus of claim 1, where in the individual beams are optically distinguishable wavelengths of visible light.

16. The wind turbine optical wind sensor of claim 1, wherein the timing between respective flashes of light emitted as matter crosses the multiple beams of light in a sensor beam are used by the controller to give an indication of speed.

17. A method of operating a wind turbine optical wind sensor, comprising:

emitting multiple beams of light as a first sensor beam, the multiple beams of light comprising two or more individual beams of light, wherein each individual beam of light has a different frequency characteristic in comparison to at least one other individual beam of light in the sensor beam;

emitting multiple beams of light as at least a second sensor beam, the multiple beams in the at least a second sensor beam light comprising two or more individual beams of light, wherein each individual beam of light has a different frequency characteristic in comparison to at least one other individual beam of light in the at least a second sensor beam, wherein the first sensor beam and the at least a second sensor beam are arranged such that they are at least partly orthogonal to each other and point in different directions at least with reference to a two dimensional detection plane;

focussing the individual beams of light in the first sensor beam at respective focal points located in the vicinity of a first light receiving device device coupled to an optical sensor, such that the focal points of the individual beams are adjacent one another;

focussing the individual beams of light in the at least a second sensor beam at respective focal points in the vicinity of the first or at least a second light receiving device, such that the focal points of the individual beams are adjacent one another;

receiving at the first and/or second light receiving device flashes of light, caused as matter carried in the wind passes through the individual beams of light; and processing, with a controller coupled to the optical sensor, processing the flashes of light detected by the optical sensor as matter carried in the wind passes through the first and the at least a second sensor beams, and based on the flashes of both the first and at least the second sensor beam determining both the speed and direction of motion of the matter and the wind in the two dimensional detection plane.

18. A computer readable medium on which a computer program is stored, wherein when the computer program is executed on a processor of a wind turbine optical wind sensor apparatus, the processor is caused to perform the steps of claim 17.

* * * * *

UNITED STATES PATENT AND TRADEMARK OFFICE
CERTIFICATE OF CORRECTION

| | |
|---|---|
| PATENT NO. | : 8,733,164 B2 |
| APPLICATION NO. | : 13/576366 |
| DATED | : May 27, 2014 |
| INVENTOR(S) | : Olesen |

It is certified that error appears in the above-identified patent and that said Letters Patent is hereby corrected as shown below:

In the Specification

Column 1, Line 47
Delete "The use of lighting" and insert -- The use of lightning --

Column 1, Line 49
Delete "Lighting conductors" and insert -- lightning conductors --

Column 1, Line 54
Delete "We have therefore" and insert -- I have therefore --

Column 2, Lines 25-26
Delete "arranged to emit at multiple beams" and insert -- arranged to emit multiple beams --

Column 2, Line 66
Delete "non electrically" and insert -- non-electrically --

Column 3, Line 18
Delete "each sensor beams" and insert -- each sensor beam --

Column 4, Lines 59-60
Delete "Lighting conductors" and insert -- Lightning conductors --

Column 9, Line 1
Delete "less reliable that for" and insert -- less reliable than for --

Column 11, Lines 33-34
Delete "sensor beams are" and insert -- sensor beams is --

Signed and Sealed this
Sixteenth Day of December, 2014

Michelle K. Lee
*Deputy Director of the United States Patent and Trademark Office*

CERTIFICATE OF CORRECTION (continued)
U.S. Pat. No. 8,733,164 B2

Column 12, Lines 39-40
Delete "definition provided the by the" and insert -- definition provided by the --

In the Claims

Claim 15
Column 14, Line 10
Delete "claim 1, where in" and insert -- claim 1, wherein --

Claim 16
Column 14, Line 15
Delete "are used by" and insert -- is used by --

Claim 17
Column 14, Line 38
Delete "receiving device device" and insert -- receiving device --

Claim 17
Column 14, Lines 49-50
Delete "processing, with a controller coupled to the optical sensor, processing the flashes of" and insert -- processing with a controller coupled to the optical sensor, the flashes of --